United States Patent [19]
Okabe et al.

[11] Patent Number: 5,875,874
[45] Date of Patent: Mar. 2, 1999

[54] ROTARY DAMPER WITH SELF-STANDING MECHANISM

[75] Inventors: Harunori Okabe; Kenji Takahashi; Hirozumi Sasa; Takeaki Kobori, all of Tokyo, Japan

[73] Assignee: Tok Bearing Co., Ltd., Tokyo, Japan

[21] Appl. No.: 59,131

[22] Filed: Apr. 13, 1998

Related U.S. Application Data

[62] Division of Ser. No. 579,310, Dec. 27, 1995, Pat. No. 5,769,188.

[30] Foreign Application Priority Data

Jul. 15, 1994  [JP]  Japan ...................................... 6-186476
Dec. 27, 1994 [JP]  Japan ...................................... 6-338023

[51] Int. Cl.⁶ ...................................................... F16F 9/53
[52] U.S. Cl. ........................................ 188/130; 188/82.84
[58] Field of Search ............................ 188/82.84, 82.77, 188/83, 296, 307, 129, 130, 82.8, 82.7

[56] References Cited

U.S. PATENT DOCUMENTS

| | | | |
|---|---|---|---|
| 2,187,923 | 1/1940 | Winkleman | 188/130 |
| 3,017,964 | 1/1962 | von Thuengen . | |
| 3,232,597 | 2/1966 | Gaydecki | 188/130 |
| 3,523,593 | 8/1970 | Karasick . | |
| 3,718,212 | 2/1973 | Havranek . | |
| 3,811,715 | 5/1974 | Brudy . | |

FOREIGN PATENT DOCUMENTS

| | | |
|---|---|---|
| 0 396 354 | 11/1990 | European Pat. Off. . |
| 0 443 919 | 8/1991 | European Pat. Off. . |
| 0519141 | 12/1992 | European Pat. Off. . |
| 2089301 | 1/1972 | France . |
| 2195996 | 3/1974 | France . |
| 2660008 | 9/1991 | France . |
| 8621214 | 12/1987 | Germany . |

Primary Examiner—Matthew C Graham
Attorney, Agent, or Firm—Merchant, Gould, Smith, Edell, Welter & Schmidt

[57] ABSTRACT

A rotary damper for use with a toilet lid has a damper shaft rotatably supported by a damper housing, a collar of synthetic resin fitted over the damper shaft for rotation therewith, and a casing of synthetic resin fixed to the damper housing and disposed around the collar for rotation relative thereto. The collar has a pair of diametrically opposite axial ridges disposed on the outer circumferential surface thereof and projecting radially outwardly. The casing has a pair of diametrically opposite cantilevered resilient arms defined by respective slits in the circumferential wall thereof. The cantilevered resilient arms have respective axial teeth disposed on the inner circumferential surface of the casing and projecting radially inwardly for engagement with the axial ridges, respectively. When the collar rotates in one direction, respective slanting surfaces of the axial ridges engage and move over the respective axial teeth, displacing the axial teeth radially outwardly against the resiliency of the cantilevered resilient arms. After the axial ridges move past the respective axial teeth, respective step surfaces of the axial ridges are locked by the axial teeth, retaining the collar and hence the damper shaft in a rotated position unless strong forces are applied to rotate the damper shaft backward.

5 Claims, 6 Drawing Sheets

ROTARY DAMPER WITH SELF-STANDING MECHANISM

This application is a Divisional of application Ser. No. 08/579,310, filed Dec. 27, 1995, which application(s) are incorporated herein by reference.

BACKGROUND OF THE INVENTION

1. Field of the Invention

The present invention relates to a rotary damper for use with a toilet lid or a similar angularly movable lid, and more particularly to a self-standing mechanism in such a rotary damper for keeping an angularly movable lid in an upright position against falling movement by gravity.

2. Description of the Prior Art

One known rotary damper with a self-standing mechanism is disclosed in Japanese laid-open patent publication No. 5-180239.

The disclosed rotary damper, which is typically used with a toilet lid, has a cylindrical casing which houses a pair of spring-biased balls and a rotor rotatably disposed in the cylindrical casing and having a pair of diametrically opposite recesses for receiving the spring-biased balls, respectively. The rotor has an axial end coupled to a shaft of the toilet lid. A viscous fluid is sealed in a space between the cylindrical casing and the rotor for damping angular movement of the rotor with respect to the cylindrical casing.

When the toilet lid is manually opened to its upright position by the user, the rotor is angularly moved in one direction about its own axis until the spring-biased balls are received in the recesses, respectively. The spring-biased balls received in the respective recesses retain the toilet lid in the upright position, typically 90° spaced upwardly from the toilet seat on the toilet bowl.

When the toilet lid is manually closed from the upright position by the user, the spring-biased balls are forced out of the respective recesses, and the toilet lid is slowly angularly moved downwardly toward the toilet seat under damping forces produced by the viscous fluid. At the time the spring-biased balls are forced out of the respective recesses, the spring-biased balls frictionally engage edges of the recesses. As the toilet lid is repeatedly opened and closed, the edges of the recesses tend to wear off to a round shape by frictional contact with the spring-biased balls. The round edges of the recesses are ineffective to retain the spring-biased balls firmly in the respective recesses, and hence to hold the toilet lid in the upright position.

SUMMARY OF THE INVENTION

It is therefore an object of the present invention to provide a rotary damper with a self-standing mechanism which is subject to a relatively small rate of wear and can hold an angularly movable lid firmly in an upright position.

Another object of the present invention is to provide a rotary damper with a self-standing mechanism which is made up of a relatively small number of parts, has a relatively small size, can be assembled relatively easily, and can be manufactured relatively inexpensively.

According to the present invention, there is provided a rotary damper comprising a damper housing, a damper shaft rotatably supported by the damper housing, a collar of synthetic resin fitted over the damper shaft for rotation therewith, and a casing of synthetic resin fixed to the damper housing and disposed around the collar for rotation relative thereto, the collar having at least one axial ridge disposed on an outer circumferential surface thereof and projecting radially outwardly, the casing having at least one cantilevered resilient arm defined by a slit in a circumferential wall thereof, the cantilevered resilient arm having an axial tooth disposed on an inner circumferential surface of the casing and projecting radially inwardly for engagement with the axial ridge.

The axial ridge may have a step surface extending from a ridge crest radially inwardly to the outer circumferential surface of the casing in one circumferential direction, and a slanting surface extending from the ridge crest radially inwardly to the outer circumferential surface of the casing in an opposite circumferential direction. The step surface may be inclined to the outer circumferential surface of the casing at an angle which is greater than an angle at which the slanting surface is inclined to the outer circumferential surface of the casing.

Preferably, the collar may have a pair of diametrically opposite axial ridges disposed on the outer circumferential surface thereof and projecting radially outwardly, and the casing may have a pair of diametrically opposite cantilevered resilient arms defined by respective slits in the circumferential wall thereof, the cantilevered resilient arms having respective axial teeth disposed on the inner circumferential surface of the casing and projecting radially inwardly for engagement with the axial ridges, respectively.

According to the present invention, there is also provided a rotary damper comprising a damper housing, a damper shaft rotatably supported by the damper housing, a collar of synthetic resin fitted over the damper shaft for rotation therewith, and a casing of synthetic resin fixed to the damper housing and disposed around the collar for rotation relative thereto, the collar having at least one cantilevered resilient arm defined by a slit in a circumferential wall thereof, the cantilevered resilient arm having an axial tooth disposed on an outer circumferential surface of the collar and projecting radially outwardly, the casing having at least one axial ridge disposed on an inner circumferential surface thereof and projecting radially inwardly for engagement with the axial ridge.

According to the present invention, there is further provided a rotary damper comprising a damper housing, a damper shaft rotatably supported by the damper housing, the damper shaft having at least one first axial groove defined in an outer circumferential surface thereof, a collar fixed to the damper housing and disposed around the damper shaft for rotation relative thereto, the collar having at least one second axial groove defined in a circumferential wall thereof, at least one first needle disposed in the first groove and having a portion projecting radially outwardly from the outer circumferential surface of the damper shaft, and at least one second needle disposed in the second groove, and an annular spring resiliently fitted over the collar and held against the second needle for resiliently pushing the second needle partly out of the second groove for engagement with the first needle.

Each of the first needle and the second needle may be made of metal.

The annular spring may have a slot defined in a portion thereof and extending fully axially thereacross, the collar having an axial stopper projecting radially outwardly and fitted in the slot. The annular spring may have a pair of resilient wings extending circumferentially one on each side of a fulcrum region of the annular spring that is positioned diametrically opposite to the slot, the resilient wings being progressively tapered off toward the slot.

The damper shaft may have a plurality of first axial grooves defined in the outer circumferential surface thereof, and the collar has a plurality of second axial grooves defined in the circumferential wall thereof, and the rotary damper may further comprise a plurality of first needles disposed in the first grooves, respectively, and having respective portions projecting radially outwardly from the outer circumferential surface of the damper shaft, and a plurality of second needles disposed in the second grooves, respectively. Specifically, the damper shaft may have a pair of diametrically opposite first axial grooves defined in the outer circumferential surface thereof, and the collar may have a pair of diametrically opposite second axial grooves defined in the circumferential wall thereof, further comprising a pair of diametrically opposite first needles disposed in the first grooves, respectively, and having respective portions projecting radially outwardly from the outer circumferential surface of the damper shaft, and a pair of diametrically opposite second needles disposed in the second grooves, respectively.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
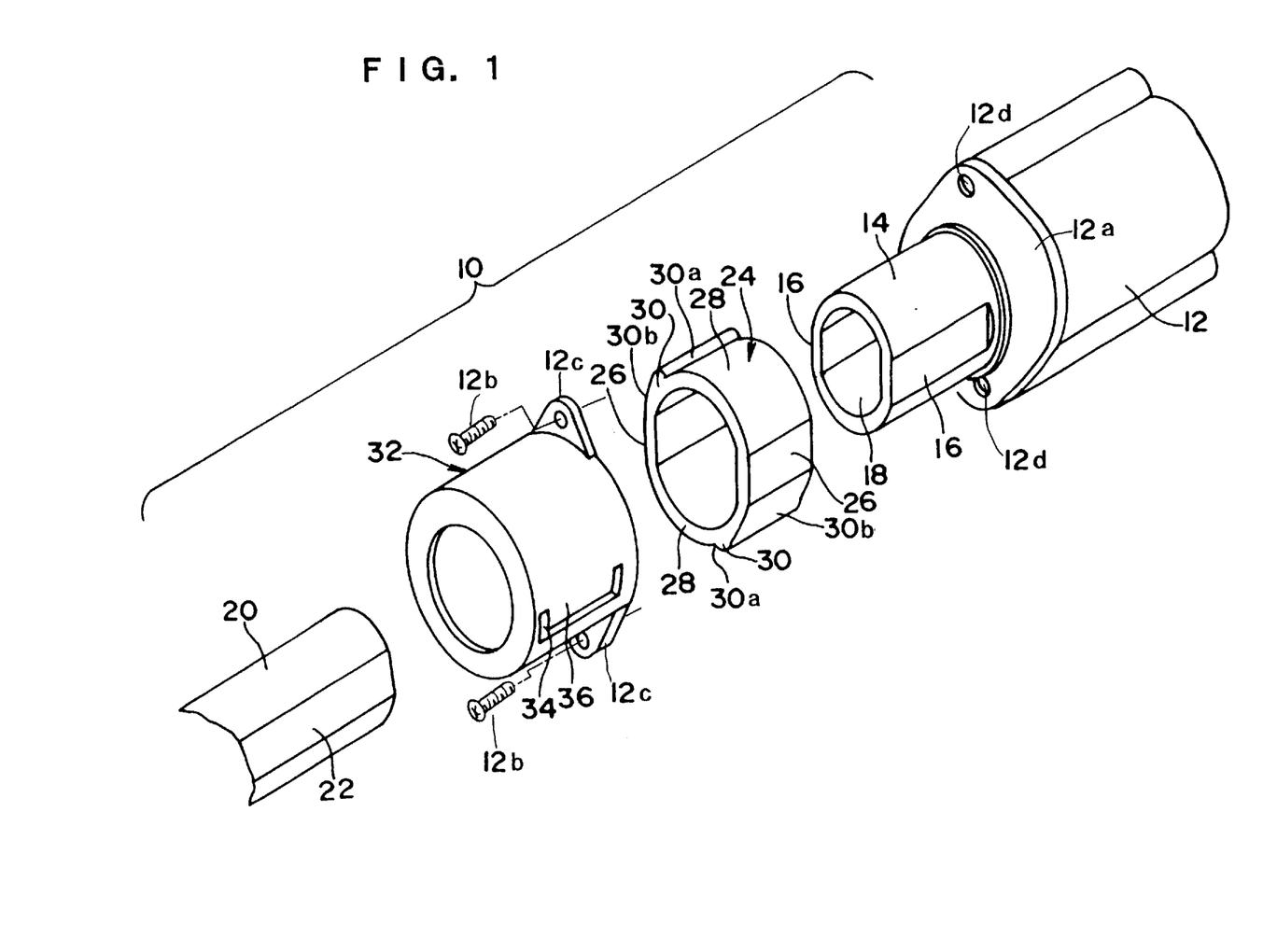
FIG. 1 is an exploded perspective view of a rotary damper according to a first embodiment of the present invention.

As shown in FIG. 1, a rotary damper 10 according to a first embodiment of the present invention has a substantially cylindrical damper housing 12 which supports a damper shaft 14 rotatably therein. The damper housing 12 accommodates therein a suitable damping medium such as a viscous fluid which acts between the damper housing 12 and a portion of the damper shaft 14 which is disposed in the damper housing 12. The damping medium applies a damping torque to the damper shaft 14 when the damper shaft 14 rotates in one direction about its own axis with respect to the damper housing 12. Such a damping action of the damping medium is well known in the art.

The damper shaft 14 also has a portion projecting out of the damper housing 12 and having a pair of diametrically opposite flat walls 16 extending axially of the damper shaft 14. The projecting portion of the damper shaft 14 has a hollow space 18 that receives therein a rotatable shaft 20, typically a shaft projecting from a toilet seat, which is snugly fitted in the hollow space 18. The rotatable shaft 20 has a pair of diametrically opposite flat walls 22 on its outer circumferential surface which extend in its axial direction.

The flat walls 22 of the rotatable shaft 20 are positioned radially inwardly of and held firmly against the respective flat walls 16 of the damper shaft 14. Consequently, when the rotatable shaft 20 rotates, the damper shaft 14 rotates in unison with the rotatable shaft 20.

The rotary damper 10 also includes a cylindrical collar 24 molded of synthetic resin which has a pair of diametrically opposite flat walls 26. The collar 24 is pressfitted over the damper shaft 14 with the flat walls 26 positioned radially outwardly of and held firmly against the respective flat walls 16 of the damper shaft 14.

The collar 24 has a pair of diametrically opposite arcuate walls 28 extending between the flat walls 26. The arcuate walls 28 have respective axial ridges 30 (see also FIG. 2) positioned in diametrically opposite relationship to each other and projecting radially outwardly away from each other. Each of the axial ridges 30 has a step surface 30a extending from a ridge crest radially inwardly to the outer circumferential surface of the arcuate wall 28 in one circumferential direction and a slanting surface 30b extending from the ridge crest radially inwardly to the outer circumferential surface of the arcuate wall 28 in the opposite circumferential direction. The angle at which the step surface 30a is inclined to the outer circumferential surface of the arcuate wall 28 is greater than the angle at which the slanting surface 30b is inclined to the outer circumferential surface of the arcuate wall 28.

A cylindrical casing 32 molded of synthetic resin is loosely fitted over the collar 24 and fastened to an end surface 12a of the damper housing 12 by screws 12b that are threaded through respective tongues 12c on the casing 32 into screw holes 12d defined in the end surface 12a of the damper housing 12.

Figure 2:
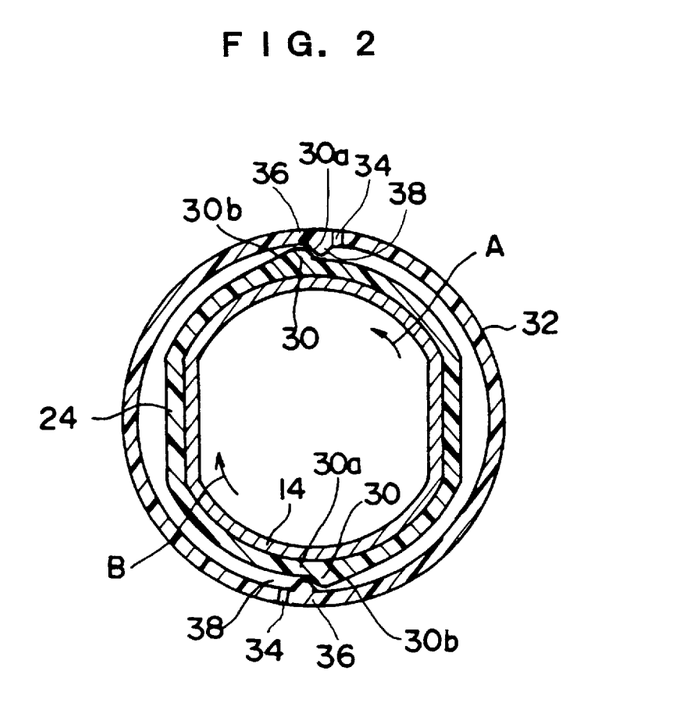
FIG. 2 is an enlarged transverse cross-sectional view of the rotary damper shown in FIG. 1.

As shown in FIGS. 1 and 2, the casing 32 has a pair of diametrically opposite channel-shaped slits 34 defined in its cylindrical wall, forming a pair of diametrically opposite cantilevered resilient arms 36 surrounded by the slits 34. The cantilevered resilient arms 36 have respective integrally formed teeth 38 positioned on their free ends and extending in the axial direction of the casing 32, the teeth 38 projecting radially inwardly from the inner circumferential surface of the casing 32 for sliding engagement with the respective axial ridges 30 on the collar 24.

Figure 2A:
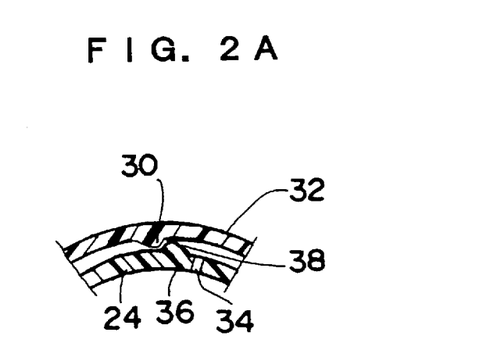
FIG. 2A is an enlarged fragmentary transverse cross-sectional view of a modified rotary damper.

In the above embodiment, the collar 24 has the ridges 30 and the casing 32 has the cantilevered resilient arms 36. However, as shown in FIG. 2A, the collar 24 may have cantilevered resilient arms 36 with teeth 38 (only one shown) and the casing 32 may have ridges 30 (only one shown).

The ridges 30 oh the collar 24 and the teeth 38 on the casing 32 jointly serve as a self-standing mechanism as described later on.

Figure 3:
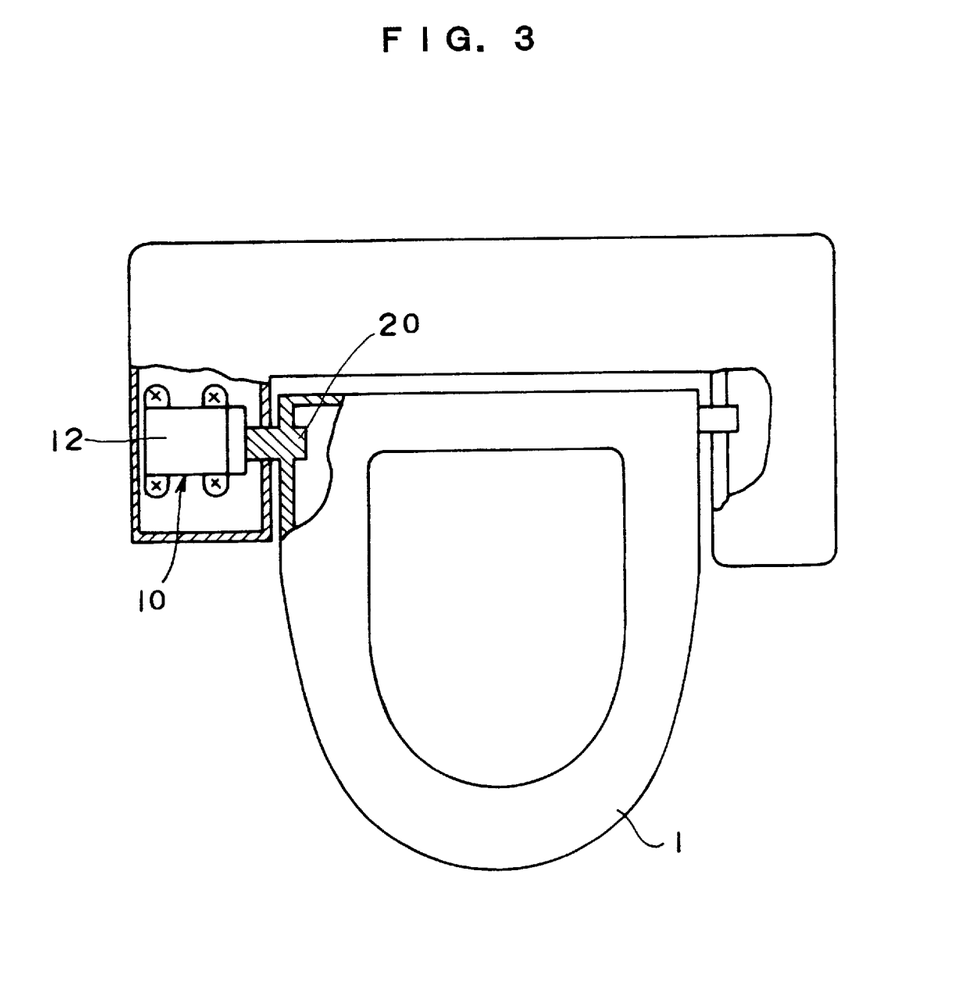
FIG. 3 is a plan view, partly cut away, showing the rotary damper that is coupled to a toilet lid.

As shown in FIG. 3, the rotary damper 10 is typically used in combination with a toilet lid 1 which incorporates the rotatable shaft 20 as one of its shafts.

When the toilet lid 1 is manually lifted open away from the toilet seat (not shown), the rotatable shaft 20 rotates counterclockwise in the direction indicated by the arrow A (FIG. 2), and the damper shaft 14 also rotates in the same direction. Since the collar 24 is press-fitted over the damper shaft 14, the collar 24 also rotates counterclockwise in the direction indicated by the arrow A.

Upon continued counterclockwise rotation of collar 24 in the direction indicated by the arrow A, the slanting surfaces 30b of the ridges 30 slidingly engage and then push the respective teeth 38 radially outwardly, elastically deforming the cantilevered resilient arms 36 gradually in the radially outward direction. When the slanting surfaces 30b move over the crests of the teeth 38, the teeth 38 snap back radially inwardly against the step surfaces 30a of the ridges 30 under the resiliency of the cantilevered resilient arms 36. The ridges 30 and the teeth 38 are now held in engagement with each other, respectively, as shown in FIG. 2. Since the step surfaces 30a are locked in engagement with the corresponding teeth 38, the collar 24 and hence the damper shaft 14 are prevented from rotating back clockwise in the direction indicated by the arrow B. Consequently, the toilet lid 1 is retained in an upright position with respect to the toilet seat by the self-standing mechanism.

While the toilet lid 1 is being lifted from the toilet seat toward the upright position, the damping medium in the housing 12 does exert a damping torque to the damper shaft 14. Therefore, the damper shaft 14 can quickly be rotated, allowing the toilet lid 1 to be lifted quickly.

When the toilet lid 1 is manually lowered from the upright position toward the toilet seat, the damper shaft 14 and hence the collar 24 are rotated clockwise in the direction indicated by the arrow B. The step surfaces 30a of the collar 24 force the teeth 38 to move radially outwardly against the resiliency of the cantilevered resilient arms 36 as they are elastically deformed radially outwardly. The step surfaces 30a now move over the crests of the teeth 38, which then snap back radially inwardly against the slanting surfaces 30b. Once the ridges 30 move past the teeth 38, the toilet lid 1 can easily be lowered toward the toilet seat.

While the toilet lid 1 is being lowered from the upright position toward the toilet seat, the damping medium in the housing 12 exerts a damping torque to the damper shaft 14. Therefore, the rotation of the damper shaft 14 and hence the collar 24 is slowed, and the toilet lid 1 is slowly lowered even under gravity.

The toilet lid 1 can be lifted into the upright position relatively smoothly and quickly with relatively small manual forces because no damping action is applied and the teeth 38 are pushed radially outwardly by the slanting surfaces 30b. Once the toilet lid 1 is in the upright position, it is reliably retained in the upright position by the step surfaces 30a held in engagement with the teeth 38. The toilet lid 1 can be lowered from the upright position less smoothly and quickly than when it is lifted into the upright position because relatively large manual forces need to be applied to move the step surfaces 30a out of locking engagement with the teeth 38.

Since the teeth 38 are disposed on the cantilevered resilient arms 36, the teeth 38 and the ridges 30 are prevented from being held in undue frictional engagement with each other, and hence from being worn unduly soon during usage.

In addition, the rotary damper 10 is made up of a relatively small number of parts, has a relatively small size, can be assembled relatively easily, and hence can be manufactured relatively inexpensively.

Figure 4:
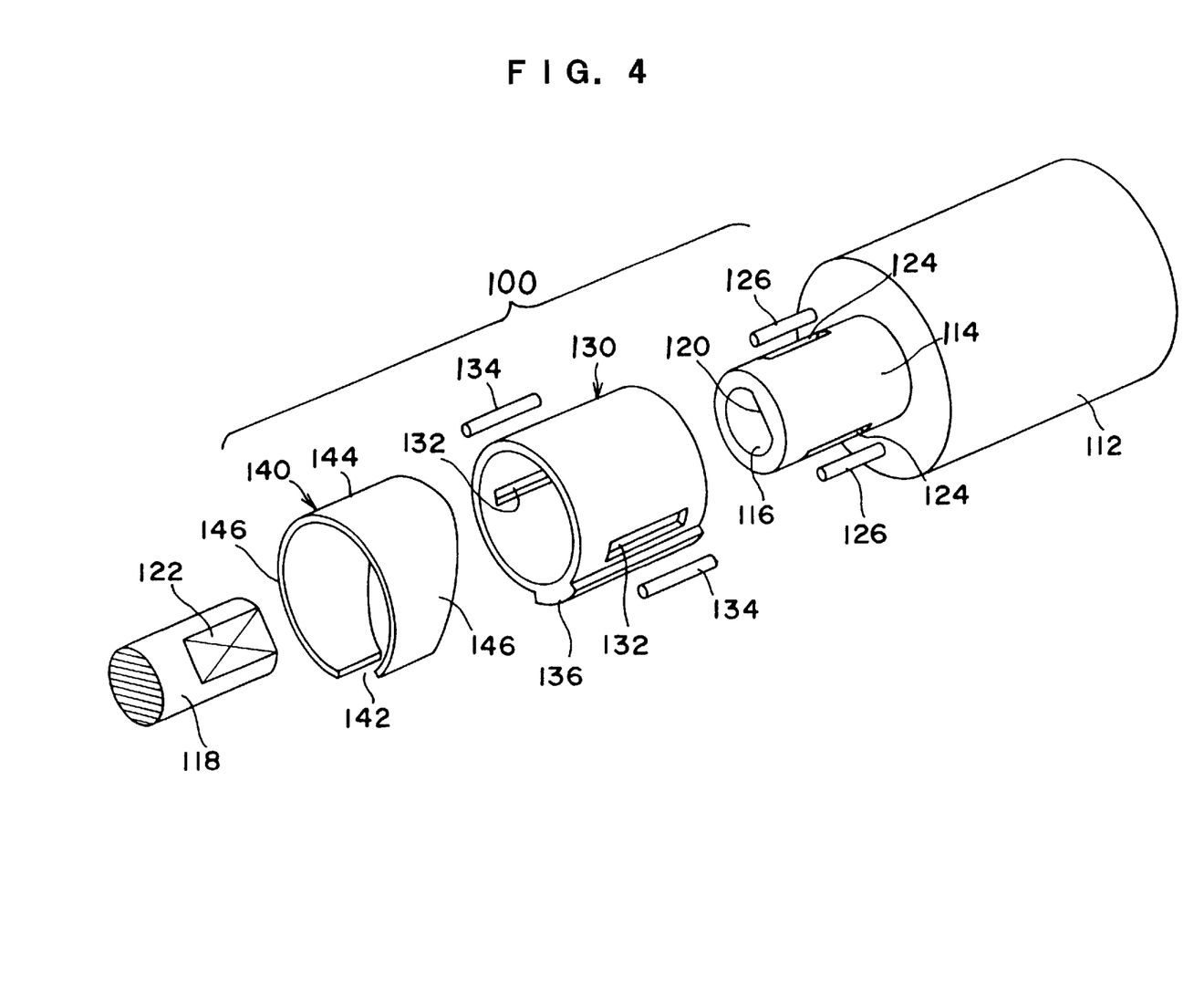
FIG. 4 is an exploded perspective view of a rotary damper according to a second embodiment of the present invention.
Figure 5:
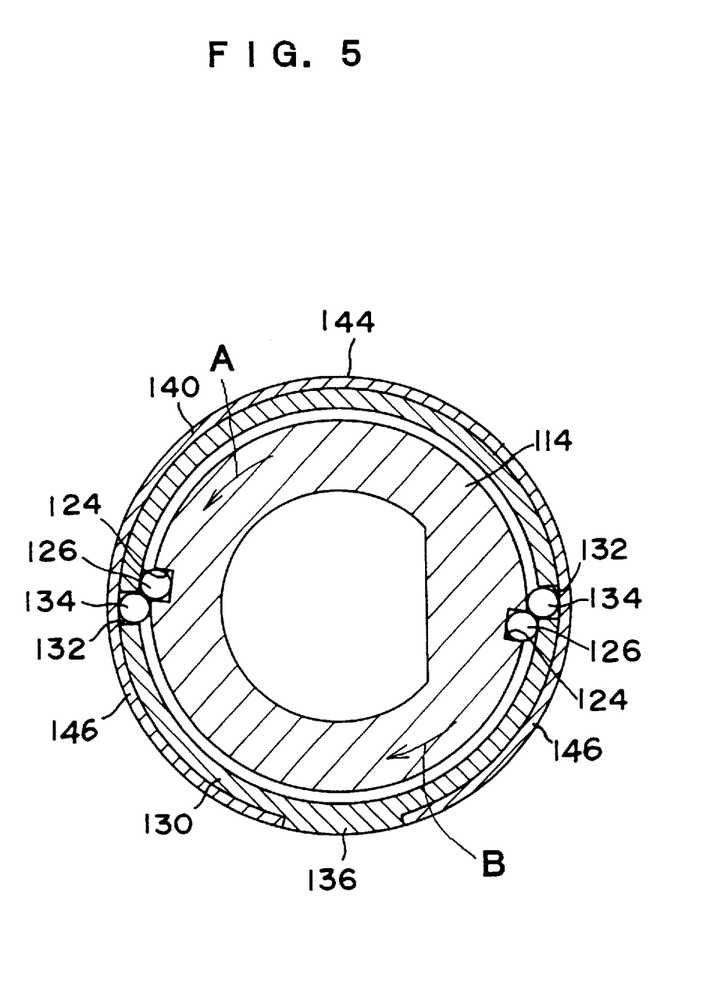
FIG. 5 is an enlarged transverse cross-sectional view of the rotary damper shown in FIG. 4.
Figure 6:
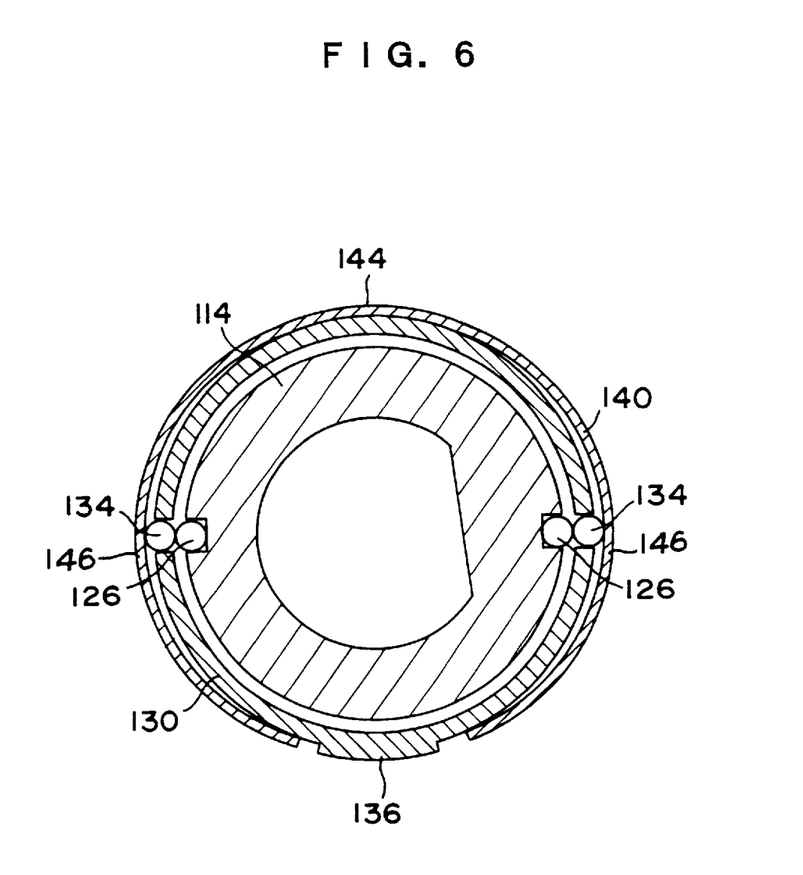
FIG. 6 is a view similar to FIG. 5, showing the rotary damper in an operative position.

FIGS. 4 through 6 show a rotary damper 100 according to a second embodiment of the present invention.

As shown in FIG. 4, the rotary damper 100 has a cylindrical damper housing 112 which supports a damper shaft 114 rotatably therein. The damper housing 112 accommodates therein a suitable damping medium which exerts a damping torque to the damper shaft 114 when the damper shaft 114 rotates in one direction about its own axis with respect to the damper housing 112 in the same manner as with the rotary damper 10 according to the first embodiment of the present invention.

The damper shaft 114 has a portion projecting out of the damper housing 112 and having an axial hole 116 defined therein partly by a flat wall 120. The axial hole 116 receives therein a rotatable shaft 118, typically a shaft projecting from a toilet seat, which is snugly fitted in the axial hole 116. The rotatable shaft 118 has a flat wall 122 extending in its axial direction. The flat wall 122 of the rotatable shaft 120 is positioned radially inwardly of and held firmly against the flat wall 120 of the damper shaft 114. Consequently, when the rotatable shaft 118 rotates, the damper shaft 114 rotates in unison with the rotatable shaft 118.

The damper shaft 114 may have an axial extension with a flat wall, rather than the axial hole 116, and the rotatable shaft 118 may have an axial hole defined therein partly by a flat wall, rather than the flat wall 122, so that the axial extension may be fitted in the axial hole for corotation of the damper shaft 114 and the rotatable shaft 118.

The axial hole 116 may have a polygonal cross-sectional shape such as a hexagonal cross-sectional shape, and the rotatable shaft 118 may also have a complementary polygonal cross-sectional shape such as a hexagonal cross-sectional shape, so that the rotatable shaft 118 may be fitted in the axial hole 116 for rotation with the damper shaft 114.

The damper shaft 114 has a pair of diametrically opposite first grooves 124 defined in its outer circumferential surface and extending axially of the damper shaft 114. The first grooves 124 receive respective first needles 126, preferably made of metal, having a circular cross section and extending axially of the damper shaft 114. The first needles 126 have substantially half portions fitted or embedded in the respective first grooves 124, such that the other half portions of the first needles 126 project radially outwardly from the outer circumferential surface of the damper shaft 114.

The rotary damper 100 also includes a cylindrical collar 130 which has a pair of diametrically opposite second grooves 132 defined in its circumferential wall and extending in the axial direction thereof. The collar 130 is loosely fitted over the damper shaft 114 and fixed at an axial end thereof to the damper housing 112. Second needles 134, preferably made of metal, having a circular cross section extend axially of the collar 130 and are loosely or radially movably fitted in the respective second grooves 132. The collar 130 has a stopper 136 of a certain width extending in the axial direction thereof and projecting radially outwardly between the second grooves 132.

An annular spring 140, which comprises a leaf-spring ring in the illustrated embodiment, is resiliently fitted over the collar 130 (see also FIGS. 5 and 6) against the second needles 134, resiliently pushing the second needles 134 so as to project radially inwardly partly out of the second grooves 132. The annular spring 140 has a slot 142 defined in a lower portion thereof and extending fully axially across the annular spring 140. The annular spring 140 has a pair of resilient wings 146 extending circumferentially one on each side of a fulcrum region 144 that is positioned diametrically opposite to the slot 142. The resilient wings 146 are progressively tapered off toward the slot 142 for dispersing stresses which would otherwise tend to concentrate on the fulcrum region 144 when the resilient wings 146 are resiliently spread radially outwardly as described later on. Since such stresses are dispersed by the tapered resilient wings 146, the annular spring 140 is highly durable in use.

The annular spring 140 is made of spring steel. The annular spring 140 may comprise a wire-spring ring or a coil spring, rather than the leaf-spring ring.

The first needles 124 received in the first grooves 124, the second needles 134 received in the second grooves 132, and the annular spring 140 jointly make up a self-standing mechanism.

As shown in FIG. 5, the stopper 136 of the collar 130 is fitted in the slot 142 in the annular spring 140, i.e., the opposite ends of the annular spring 140 are held against the opposite sides, respectively, of the stopper 136. Therefore, the annular spring 140 is prevented from rotating relatively to the collar 130. The collar 130 may have a stop ridge or stop ridges on the outer circumferential surface thereof at an end thereof remote from the damper housing 112 for retaining the annular spring 140 on the collar 130.

When a toilet lid connected to the damper shaft 114 by the rotatable shaft 118 is manually lifted open away from its corresponding toilet seat, the damper shaft 114 rotates counterclockwise in the direction indicated by the arrow A (FIG. 5), and the projecting half portions of the first needles 126 are brought into contact with the portions of the second needles 134 which project radially inwardly out of the respective second grooves 132. Continued rotation of the damper shaft 114 causes the first needles 126 to push the second needles 134 radially outwardly against the resiliency of the annular spring 140, whereupon the resilient wings 146 of the annular spring 140 are elastically deformed apart radially outwardly about the fulcrum region 144 as shown in FIG. 6. The damper shaft 114 is continuously rotated until the first needles 126 move over the second needles 134, which then snap back radially inwardly under the bias of the annular spring 140. The first needles 126 engage the second needles 134, preventing the damper shaft 114 from rotating back clockwise. At this time, the toilet lid is retained in its upright position by the self-standing mechanism.

The toilet lid remains in its upright position unless it is manually lowered toward the toilet seat under forces large enough to rotate the damper shaft 114 in the direction indicated by the arrow B to enable the first needles 126 to forcibly displace the second needles 134 radially outwardly against the bias of the annular spring 146.

While the first needles 124 and the second needles 134 are positioned in diametrically opposite relationship, i.e., 180° spaced apart, in the illustrated embodiment, the first needles 124 and the second needles 134 may be provided in two respective sets of pairs that are 90° spaced apart since the toilet lid is usually required to be angularly moved 90° from the toilet seat to the upright position and back. Alternatively, the first needles 124 and the second needles 134 may be provided in freely selected angularly spaced positions to retain the damper shaft 14 in a freely selected angular position with respect to the damper housing 112.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A rotary damper comprising:

a damper housing;

a damper shaft rotatably supported by said damper housing;

a collar of synthetic resin fitted over said damper shaft for rotation therewith; and a casing of synthetic resin fixed to said damper housing and disposed around said collar for rotation relative thereto;

said collar having at least one axial ridge disposed on an outer circumferential surface thereof and projecting radially outwardly;

said casing having at least one cantilevered resilient arm defined by a slit in a circumferential wall thereof, said cantilevered resilient arm having an axial tooth disposed on an inner circumferential surface of said casing and projecting radially inwardly for engagement with said axial ridge.

2. A rotary damper according to claim 1, wherein said axial ridge has a step surface extending from a ridge crest radially inwardly to the outer circumferential surface of said collar in one circumferential direction, and a slanting surface extending from the ridge crest radially inwardly to the outer circumferential surface of said collar in an opposite circumferential direction.

3. A rotary damper according to claim 2, wherein said step surface is inclined to the outer circumferential surface of said collar at an angle which is greater than an angle at which said slanting surface is inclined to the outer circumferential surface of said collar.

4. A rotary damper according to claim 1, wherein said collar has a plurality of circumferentially spaced axial ridges disposed on the outer circumferential surface thereof and projecting radially outwardly, and said casing has a plurality of cantilevered resilient arms defined by respective slits in the circumferential wall thereof, said cantilevered resilient arms having respective axial teeth disposed on the inner circumferential surface of said casing and projecting radially inwardly for engagement with said axial ridges, respectively.

5. A rotary damper according to claim 4, wherein said collar has a pair of diametrically opposite axial ridges disposed on the outer circumferential surface thereof and projecting radially outwardly, and said casing has a pair of diametrically opposite cantilevered resilient arms defined by respective slits in the circumferential wall thereof, said cantilevered resilient arms having respective axial teeth disposed on the inner circumferential surface of said casing and projecting radially inwardly for engagement with said axial ridges, respectively.

* * * * *